July 25, 1950 J. E. RICHARDS ET AL 2,516,802
TREE HOLDER
Filed Jan. 17, 1949
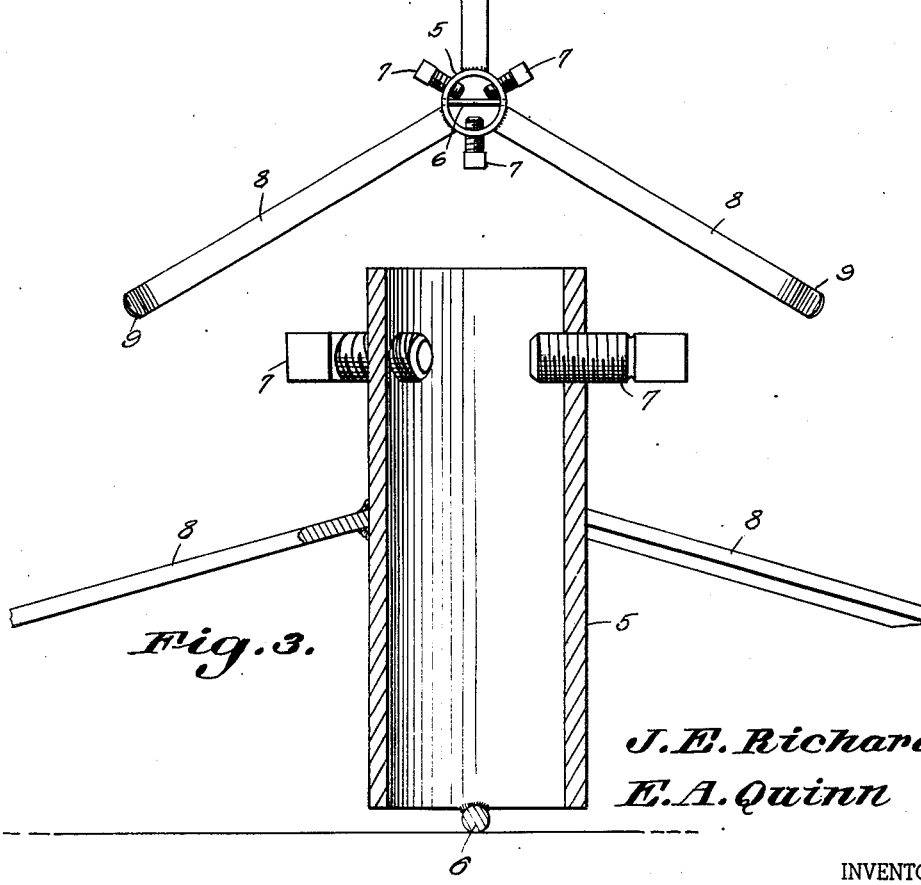
J. E. Richards
E. A. Quinn
INVENTOR
BY C. A. Snow & Co.
ATTORNEYS.

Patented July 25, 1950

2,516,802

UNITED STATES PATENT OFFICE 2,516,802

TREE HOLDER

Joseph E. Richards and Eugene A. Quinn, Safford, Ariz.

Application January 17, 1949, Serial No. 71,325

1 Claim. (Cl. 248—44)

This invention relates to tree holders designed for supporting Christmas trees.

The primary object of the invention is to provide a tree holder, which will support a tree in a true vertical position, regardless of the diameter of the trunk of the tree, within certain bounds.

Another object of the invention is to provide a tree holder including a tubular body portion, supplied with a rod extended across the lower end thereof to provide a stop for the tree positioned within the holder to prevent the tree from extending through the bottom of the holder, when a tree with a trunk of small diameter is to be supported in the device.

Still another object of the invention is to provide a tree holder wherein the rod which extends across the bottom thereof, will provide a substantially small bearing surface to permit the holder to be readily moved by sliding the holder with its tree over the surface on which it is positioned.

A still further object of the invention is to provide a tree holder which may be easily covered with cotton, moss or other material used in decorating at the bottom of a Christmas tree.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Figure 1 is a side elevational view of a Christmas tree holder constructed in accordance with the invention.

Fig. 2 is a plan view thereof.

Fig. 3 is a longitudinal sectional view through the holder.

Referring to the drawing in detail, the holder comprises a tubular body portion 5 across the bottom of which extends the rod 6, the rod 6 being rounded to present a supporting surface for the body portion so that if desired, the body portion with the tree supported therein, may be readily slid over the surface on which the body portion is resting. This rod 6 also provides a stop on which the lower end of the tree held within the body portion rests, to prevent the tree, when a tree of small diameter is placed therein, from passing through the bottom of the body portion to rest on the floor surface.

Set screws 7 extend through the wall of the tubular body portion and are positioned in threaded openings so that the set screws can be tightened against the tree to secure the tree within the body portion and hold the tree in a true vertical position.

Supporting legs 8 extend from the body portion 5 at points intermediate the ends thereof, which supporting legs contact with the floor surface to brace the body portion and hold it against tilting, under the weight of the tree positioned therein.

The outer ends of the supporting legs 8 are curved upwardly as at 9 so that the ends of the supporting legs will not damage the floor surface.

From the foregoing it will be seen that due to the construction shown and described, we have provided a Christmas tree holder or support which may be used in supporting trees having trunks of various diameters, the holder being provided with a rod extending across the bottom thereof to be engaged by the end of a Christmas tree of small diameter, which would otherwise pass through the bottom of the holder and rest on the supporting surface.

Having thus described the invention, what is claimed is:

A tree holder, comprising a tubular body, a rod circular in cross section, extended across the lower end of the tubular body centrally thereof, providing a support for the holder supporting the holder with its lower end spaced from a supporting surface, said support also providing a stop against which the lower end of a tree trunk held within the holder, rests, set screws extending through threaded openings in the body and engageable with a tree placed therein, holding the tree in an upright position, and supporting legs extending from the body and resting on the supporting surface.

JOSEPH E. RICHARDS.
EUGENE A. QUINN.

REFERENCES CITED

The following references are of record in the file of this patent:

UNITED STATES PATENTS

| Number | Name | Date |
|---|---|---|
| 594,491 | Silverman | Nov. 30, 1897 |
| 750,742 | Weston | Jan. 26, 1904 |
| 2,421,140 | Blaner | May 27, 1947 |